US011644278B2

(12) United States Patent
Reed et al.

(10) Patent No.: US 11,644,278 B2
(45) Date of Patent: May 9, 2023

(54) WEAPON SIMULATION SYSTEMS

(71) Applicant: University of Central Florida Research Foundation, Inc., Orlando, FL (US)

(72) Inventors: Dean Reed, Titusville, FL (US); Devyn Dodge, Orlando, FL (US); Troyle Thomas, Winter Springs, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 17/137,287

(22) Filed: Dec. 29, 2020

(65) Prior Publication Data

US 2021/0199408 A1 Jul. 1, 2021

Related U.S. Application Data

(60) Provisional application No. 62/955,962, filed on Dec. 31, 2019.

(51) Int. Cl.
| | | |
|---|---|---|
| *F41G 3/26* | (2006.01) | |
| *F41A 33/02* | (2006.01) | |
| *G06T 19/00* | (2011.01) | |
| *G06N 20/00* | (2019.01) | |
| *F41G 3/32* | (2006.01) | |

(52) U.S. Cl.
CPC ............ *F41G 3/2633* (2013.01); *F41A 33/02* (2013.01); *F41G 3/32* (2013.01); *G06N 20/00* (2019.01); *G06T 19/006* (2013.01)

(58) Field of Classification Search
CPC . F41G 3/26; F41G 3/2633; F41G 3/32; F41A 33/00; F41A 33/02; F41A 33/04; F41A 33/06; G06T 19/006; G06N 20/00
See application file for complete search history.

(56) References Cited

U.S. PATENT DOCUMENTS

| 8,528,244 B2 | 9/2013 | Scallie et al. | |
|---|---|---|---|
| 10,788,285 B2 * | 9/2020 | Engelstein | F41A 17/34 |
| 2013/0249947 A1 * | 9/2013 | Reitan | G06F 3/011 |
| | | | 345/633 |
| 2017/0307333 A1 * | 10/2017 | Northrup | G06F 3/011 |

* cited by examiner

*Primary Examiner* — Timothy A Musselman
(74) *Attorney, Agent, or Firm* — Locke Lord LLP; Daniel J. Fiorello

(57) ABSTRACT

A device can include one or more sensors configured to output sensor data, and a trigger detection module configured to receive the sensor data from the one or more sensors and to determine whether a trigger event has occurred. The trigger detection module can be configured to output a trigger detection signal when the trigger event is detected. The trigger detection signal can be configured to be used by an augmented reality or virtual reality system to cause an augmented reality or virtual reality event.

18 Claims, 5 Drawing Sheets

WEAPON SIMULATION SYSTEMS

CROSS-REFERENCE TO RELATED APPLICATIONS

This application claims priority to and the benefit of U.S. Provisional Application No. 62/955,962, filed Dec. 31, 2019, the entire contents of which are herein incorporated by reference in their entirety.

STATEMENT OF GOVERNMENT RIGHTS

This invention was made with government support under contract no. W911NF-15-2-0099 awarded by the Department of the Army. The government has certain rights in the invention.

FIELD

This disclosure relates to weapon simulation systems, e.g., for firearms.

BACKGROUND

Traditional weapons training, e.g., for military personnel, can include firearms and other weapons training using devices and/or ammunition for simulated use of the weapon. For example, the traditional firearms training system can include laser technology that is over 25 years old, is expensive, and does not accurately simulate weapons fire. Current training infrastructure is heavily reliant on manufacturers of expensive surrogate training weapons made solely for the purpose of training.

Such conventional methods and systems have generally been considered satisfactory for their intended purpose. However, there is still a need in the art for improved weapon simulation systems. The present disclosure provides a solution for this need.

SUMMARY

In accordance with at least one aspect of this disclosure, a device can include one or more sensors configured to output sensor data, and a trigger detection module configured to receive the sensor data from the one or more sensors and to determine whether a trigger event has occurred. The trigger detection module can be configured to output a trigger detection signal when the trigger event is detected. The trigger detection signal can be configured to be used by an augmented reality system or a virtual reality system to cause an augmented reality or virtual reality event.

The trigger detection module can be configured to classify the trigger event to one of a plurality of known trigger event types. The trigger detection module can include a machine learning model configured to process the sensor data and to classify the trigger event.

The machine learning model can include one or more hidden layers, an output layer, and a classified results layer. Each hidden layer can include one or more neurons with weights and an activation function which applies non-linearity to produce non-linear results, for example. The output layer can add up the results from the one or more hidden layers and converts the data into one or more bits or bitstrings. The classified results layer can be configured to correlate the one or more bits or bitstrings from the output layer into discrete states to output the trigger event type in the trigger detection signal.

The machine learning model of the device can be taught and can include one or more learned weights. The one or more sensors can include one or more accelerometers, for example. The one or more sensors can further include one or more gyroscopes, one or more acoustic sensors, and/or one or more hall sensors.

The device can include a wireless communication device configured to output the trigger detection signal and a battery configured to power the trigger detection module and/or the wireless communication device. Any other suitable components are contemplated herein.

The trigger event can be a firearm event, for example. In certain embodiments, the firearm event can be a weapon firing event. The device can be shaped to mount within a firearm grip, or configured to mount to a rail system of a firearm, or configured to mount to a trigger guard of a fire arm.

In accordance with at least one aspect of this disclosure, an augmented reality system or a virtual reality system can include a device as disclosed herein, e.g., as described above, an augmented reality or virtual reality display, and an augmented reality or virtual reality processor configured to receive the trigger detection signal and to cause an augmented reality or virtual reality event on the augmented reality or virtual reality display. The augmented reality or virtual reality event can be a simulated projectile event when the trigger detection signal indicates a fire event occurred such that upon receiving the trigger detection signal a simulated projectile is created by the augmented reality or virtual reality processor and displayed on the augmented reality or virtual reality display.

The augmented reality or virtual reality processor can be configured to determine trajectory of the simulated projectile as a function of firearm orientation data included in the trigger detection signal. In certain embodiments, the system can include the firearm and one or more blank cartridges.

In accordance with at least one aspect of this disclosure, a method can include receiving (e.g., at a processor) one or more sensor signals from one or more sensors, determining, based on the received one or more sensor signals, using a machine learning model, whether a trigger event has occurred, and outputting a trigger detection signal if a trigger event has occurred. The method can include classifying the trigger event to one or more firearm event types before outputting the trigger detection signal.

In certain embodiments, outputting includes outputting the trigger detection signal to an augmented reality system or a virtual reality system. The method can include conducting weapons training using the augmented reality or virtual reality system or the virtual reality system.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
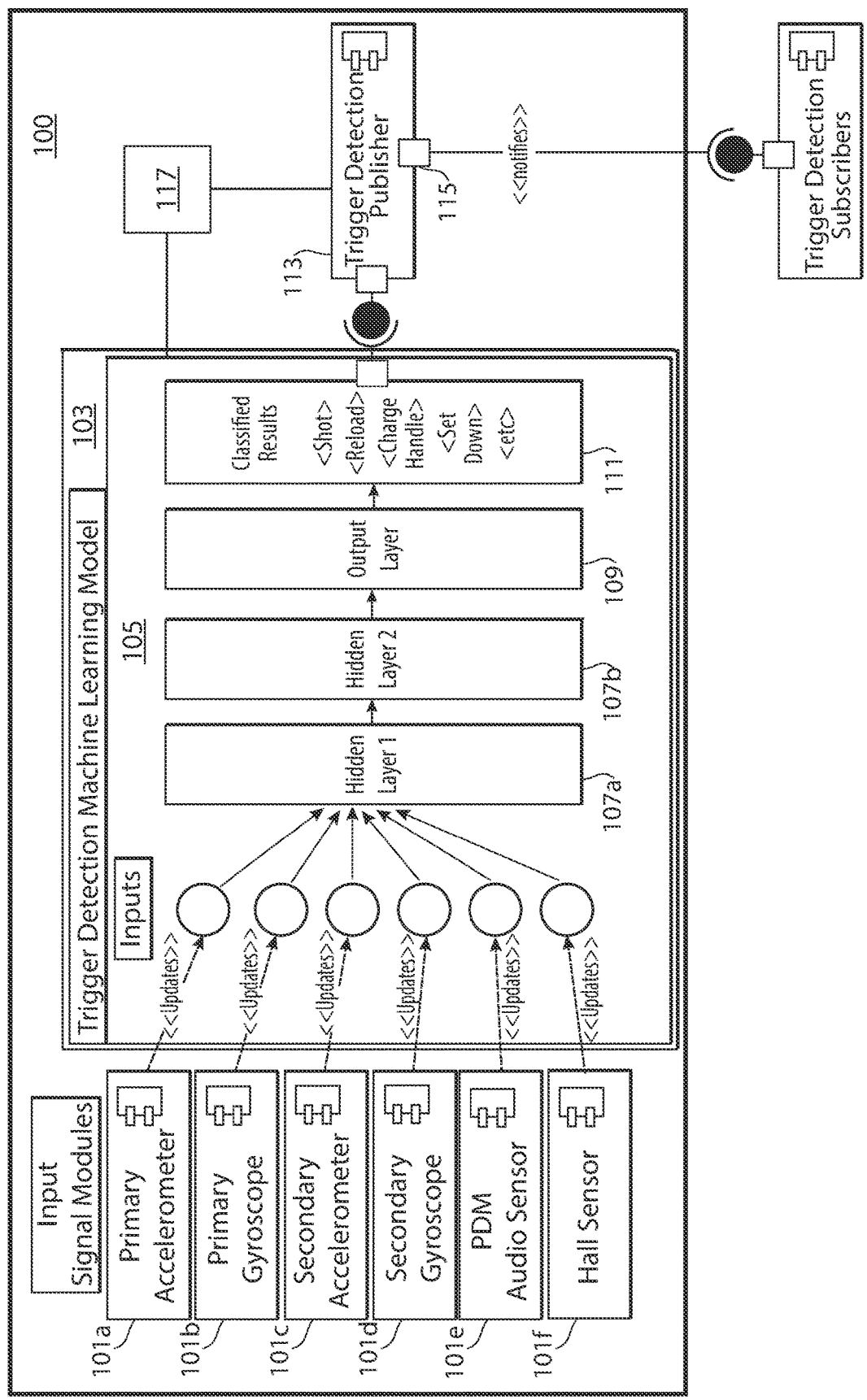
FIG. 1 is a schematic diagram of an embodiment of a device in accordance with this disclosure.

Reference will now be made to the drawings wherein like reference numerals identify similar structural features or aspects of the subject disclosure. For purposes of explanation and illustration, and not limitation, an illustrative view of an embodiment of a device in accordance with the disclosure is shown in FIG. 1 and is designated generally by reference character 100. Other embodiments and/or aspects of this disclosure are shown in FIGS. 2A-5. Certain embodiments described herein can be used to provide augmented reality or virtual reality weapons training systems, for example. Any other suitable use is contemplated herein.

Referring to FIG. 1, a device 100 can include one or more sensors 101a, b, c, d, e f configured to output sensor data. The device 100 can include a trigger detection module 103 configured to receive the sensor data from the one or more sensors 101a-f and to determine whether a trigger event has occurred. The trigger detection module 103 can be configured to output a trigger detection signal when the trigger event is detected. The trigger detection signal can be configured to be used by an augmented reality or a virtual reality system to cause an augmented reality or a virtual reality event (e.g., simulated gun firing and bullet trajectory computation, display, and/or bullet interaction with a digital target or augmented target). The trigger detection module 103 can include any suitable hardware (e.g., a processor, RAM, power supply, etc.) and/or software module(s) configured to perform any suitable function (e.g., as disclosed herein).

The trigger detection module 103 can be configured to classify the trigger event to one of a plurality of known trigger event types, for example. In certain embodiments, the trigger detection module 103 can include a machine learning model 105 configured to process the sensor data and to classify the trigger event.

The machine learning model 105 can include one or more hidden layers 107a, 107b, an output layer 109, and a classified results layer 111. A hidden layer 107a can be configured to receive the input sensor data from the one or more sensors 101a-f, for example. Each hidden layer 107a 107b can include one or more neurons with weights and an activation function which applies non-linearity to produce non-linear results, for example. Any other suitable configuration for a hidden layer as appreciated by those having ordinary skill in machine learning is contemplated herein.

The output layer 109 can be configured to add up the results from the one or more hidden layers 107a, 107b and convert the data into one or more bits (e.g., a 1 or 0) or bitstrings (e.g., a series of 1s and 0s). The classified results layer 111 can be configured to correlate the one or more bits or bitstrings from the output layer 109 into discrete states to output the trigger event type in the trigger detection signal. For example, the classified results layer 111 can classify results into discreet states by mapping a bit string from the output layer 109 to states (e.g., 010 fire event, 100 equals reload).

The machine learning model 103 of the device can be taught and can include one or more learned weights. In this regard, the device 100 can include an already learned model that is prepared to perform properly upon installation and use on a weapon of a user, for example. In certain embodiments, each device 100 can be made to be weapon specific, and the machine learning model 103 can be trained for the specific weapon (e.g., a rifle vs. a handgun) that the device 100 is made to interact with. In certain embodiments, the device 103 can be provided to users without having been trained yet, and the user can train the model 103. Any other suitable amount of training for the machine learning model 103 is contemplated herein.

The one or more sensors 101a-f can include one or more accelerometers 101a, 101c (e.g., two for redundancy or for additional axis measurement), for example. The one or more sensors 101a-f can further include one or more gyroscopes 101b, 101d, one or more acoustic sensors 101e, and/or one or more hall sensors 101f. The one or more sensors can include barometric pressure sensor, for example. Any suitable number of sensors and/or combinations of types for any suitable purpose (e.g., redundancy or additional data type) is contemplated herein.

The device 100, e.g., the model 103 or any suitable separate module, can be configured determine ground truth weapon state. The sensor boards can be modular, and independent of the main compute module to enable rapid reconfiguration, for example.

The device 100 can include a trigger detection publisher module 113 configured to receive the classified results from the classified results layer 111 and to output the trigger detection signal (e.g., in the form of data packets). The trigger detection publisher 113 can be a Interface Communication Document (ICD) device.

The device 100 can include a wireless communication device 115 (e.g., a low energy Bluetooth chip) connected to the trigger detection publisher module 113 and configured to output the trigger detection signal (e.g., to one or more trigger detection subscribers as shown). In certain embodiments, the communication mechanism can be or include a wired connection. Any suitable type of data output and/or format thereof is contemplated herein.

In certain embodiments, the device can include a battery 117 configured to power the trigger detection module 103 and/or the wireless communication device 115, any/or any other suitable component of the device 100, for example. In certain embodiments, the device 100 can include a data card (e.g., an SD card) that can allow for logging of all the events locally and retrieving later for example. In certain embodiments, the device 100 can include hardwire connection port to retrieve data or to operate wired to the display. Any other suitable components for the device 100 are contemplated herein (e.g., data storage, memory, processor).

The trigger event can be a firearm event (e.g., firing, reload, set down, safety switch, fire-type switch, charge handle use, etc.), for example. In certain embodiments, the firearm event can be a weapon firing event. Any other suitable weapon event is contemplated herein.

The device 100 can be made with any suitable form factor for the desired application (e.g., a firearm compatible shape) with any suitable features and/or mounts attached thereto.

Figure 2A:
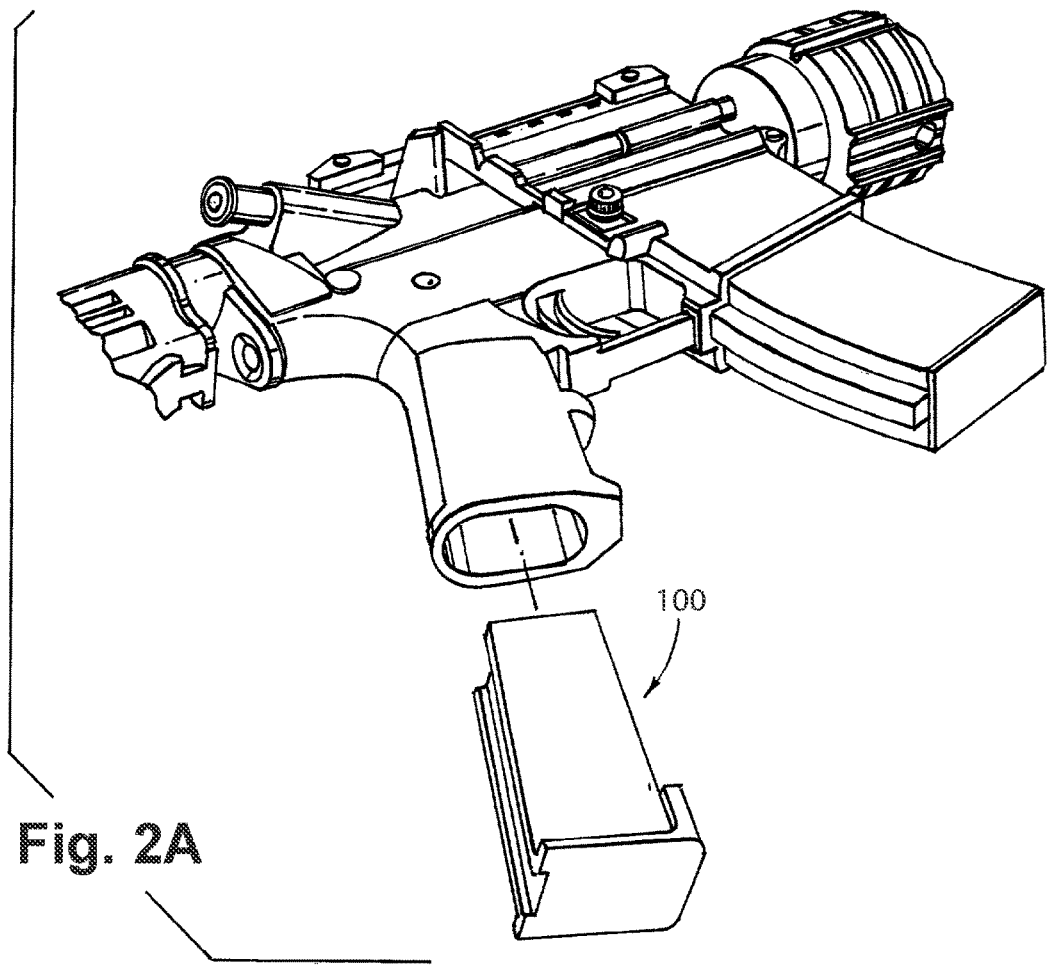
FIG. 2A is a perspective view of an embodiment of a device in accordance with this disclosure, shown being inserted into a grip of a firearm.
Figure 2B:
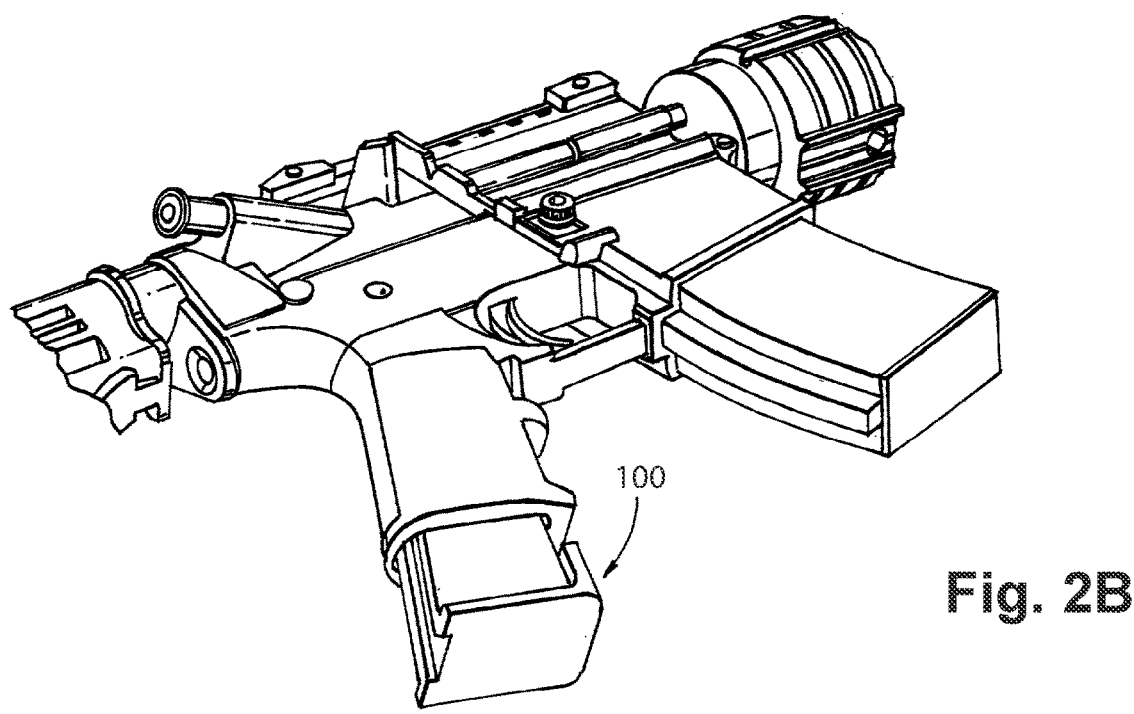
FIG. 2B is a perspective view of an embodiment of a device in accordance with this disclosure, shown inserted into a grip of a firearm.
Figure 3:
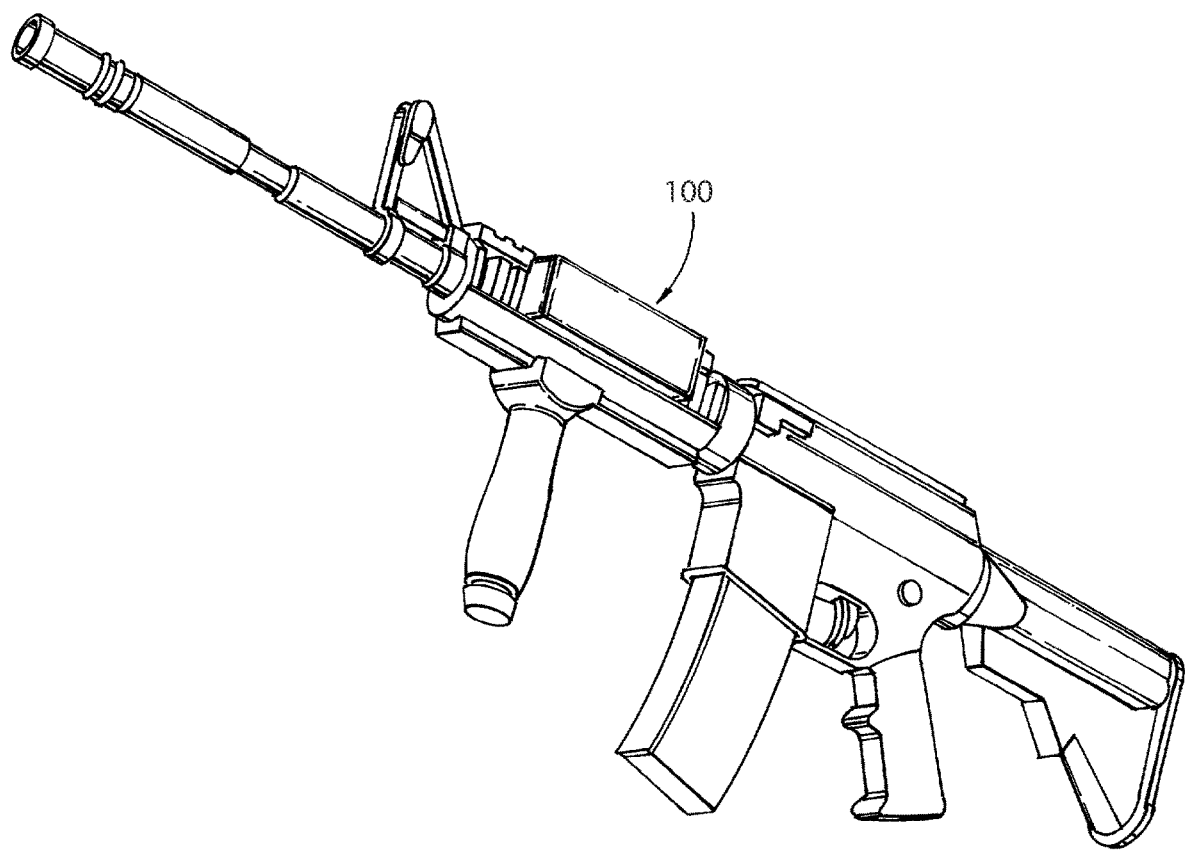
FIG. 3 is a perspective view of an embodiment of a device in accordance with this disclosure, shown attached to a firearm rail system.
Figure 4:
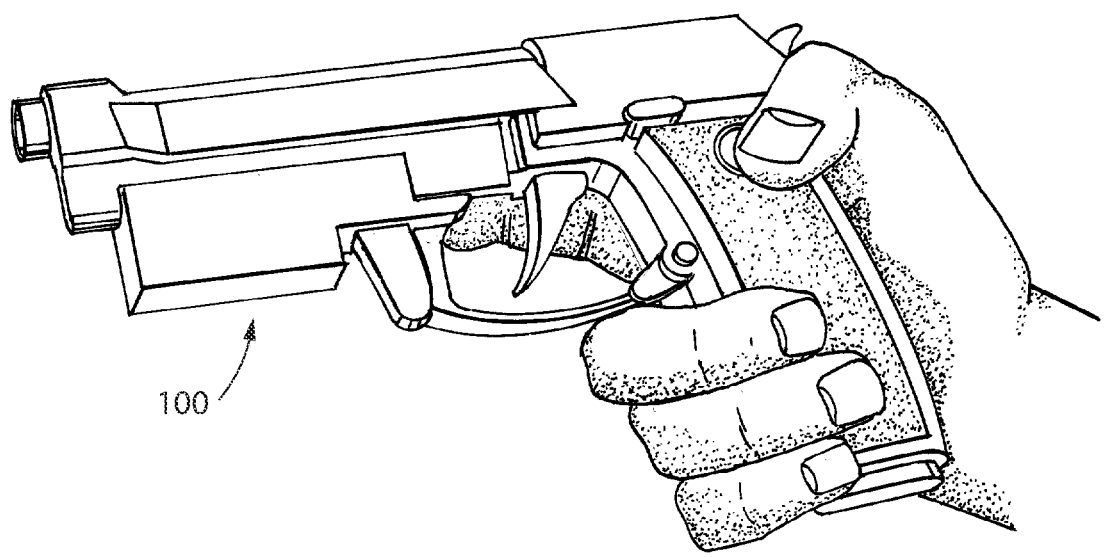
FIG. 4 is a perspective view of an embodiment of a device in accordance with this disclosure, shown attached to a trigger guard of a firearm.

For example, referring additionally to FIGS. 2A, 2B, 3, and 4, the device 100 can be shaped to mount within a firearm grip (e.g., as shown in FIGS. 2A and 2B), or can be configured to mount to a rail system (e.g., a Picatinny rail) of a firearm (e.g., as shown in FIG. 3), or configured to mount to a trigger guard of a firearm (e.g., as shown in FIG. 4). Any other suitable form factor (e.g., for rifles, handguns, or other suitable weapons) is contemplated herein.

Figure 5:
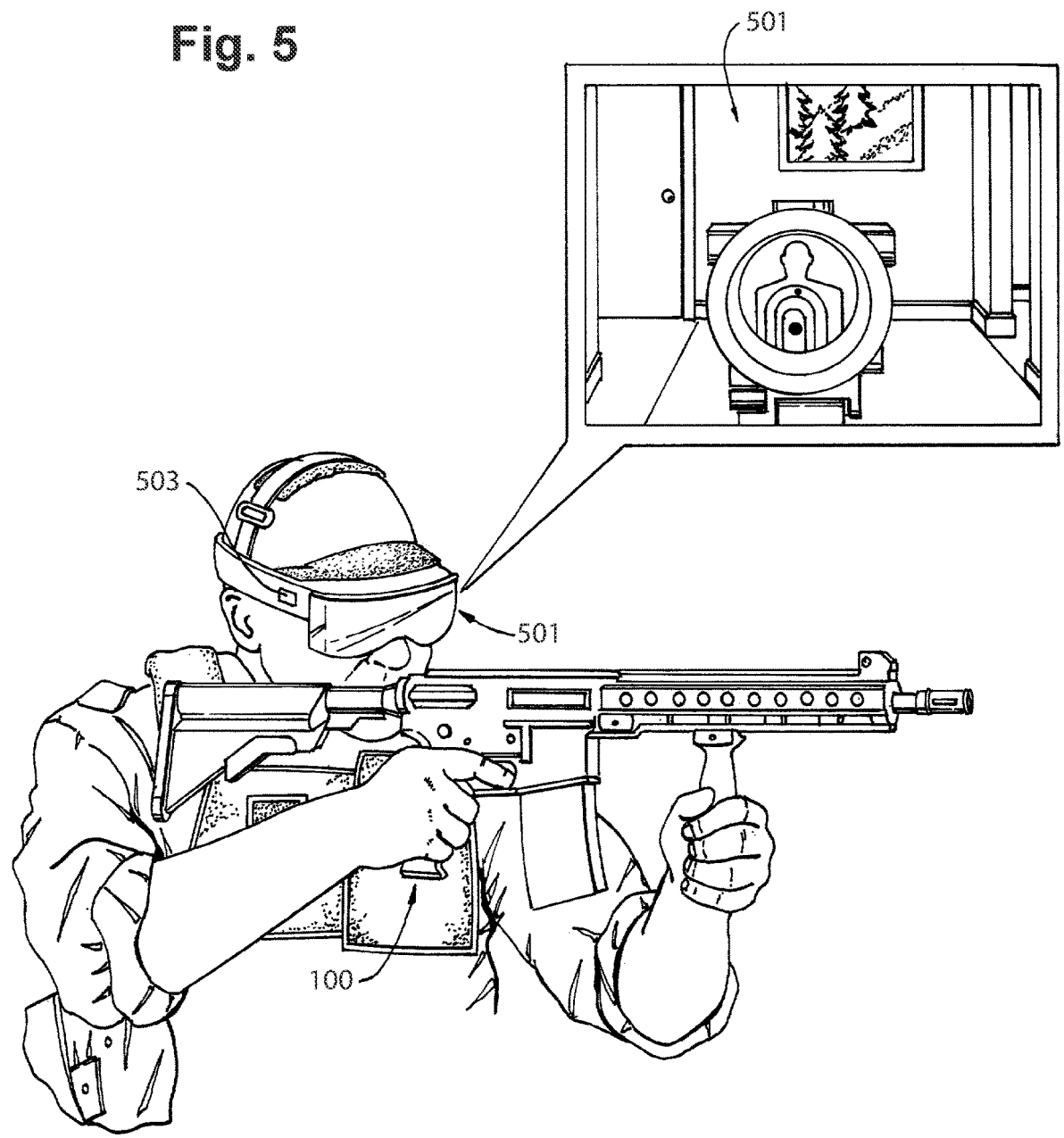
FIG. 5 is a schematic view of an embodiment of an augmented reality system in accordance with this disclosure, shown in use.

Referring additionally to FIG. 5, in accordance with at least one aspect of this disclosure, an augmented reality system 500 can include a device 100 (shown inside grip) as disclosed herein, e.g., as described above, an augmented reality display 501, and an augmented reality processor 503 (shown integrated with the display 501) configured to receive the trigger detection signal and to cause an augmented reality event on the augmented reality display 501. The augmented reality event can be a simulated projectile event when the trigger detection signal indicates a fire event occurred such that upon receiving the trigger detection signal a simulated projectile is created by the augmented reality processor 503 and displayed on the augmented reality display 501. The augmented reality processor 503 can include any suitable hardware and/or software module(s). The display 501 can include any suitable form factor (e.g., goggles) and/or display type.

The one or more sensors of the device 100 can be configured to provide orientation data (e.g., continuously if desired) to the augmented reality processor 503. The augmented reality processor 503 can be configured to determine trajectory of the simulated projectile as a function of firearm orientation data, e.g., that is continuously provided and/or included in the trigger detection signal. In certain embodiments, the system can include firearm and one or more blank cartridges. Embodiments can be similarly applied to a virtual reality system.

In accordance with at least one aspect of this disclosure, a method can include receiving (e.g., at a processor) one or more sensor signals from one or more sensors, determining, based on the received one or more sensor signals, using a machine learning model, whether a trigger event has occurred, and outputting a trigger detection signal if a trigger event has occurred. The method can include classifying the trigger event to one or more firearm event types before outputting the trigger detection signal.

In certain embodiments, outputting includes outputting the trigger detection signal to an augmented reality system. The method can include conducting weapons training using the augmented reality system. The method can include any other suitable method and/or portions thereof are contemplated herein.

Embodiments can provide a means to instrument current force weapons (e.g., M4, M9, M17, SAW) so that AR, VR and live training sessions can be conducted. Embodiments deliver high response trigger events, provides weapon orientation data, and can internally records all relevant sensor data for post exercise analysis, for example. Embodiments can enable a user, e.g., a soldier to interact with common AR headsets with both real weapons and commercially available surrogate weapons. A user can fire blank rounds from a real weapon and engage kinetic targets in augmented reality. Embodiments can also allow a commercial surrogate weapon that interacts with HMDs to engage AR entities.

Embodiments can be a lightweight, low-cost solution that can mount in a pistol grip (e.g., of an M4). Certain embodiment can connect to the Picatinny Rail System (PRS). Using any configuration can allow a head-mounted display, e.g., a Hololens sold by Microsoft, to receive weapon orientation data and high-quality characterized weapon fire events. Embodiments can support a robust open Interface Communication Document (ICD) that can be tailored to suit a variety of end-user live training applications.

Certain embodiments can be based on an array of sensors. Certain embodiments can leverage dual high-precision accelerometers, a gyroscope, hall sensor and pressure-based acoustic MEMS device to determine ground truth weapon state, for example. Embodiments can provide reliable, low latency shot detection to a variety of commercial and custom AR systems as well as providing the detailed shot characteristics for after action reviews. Embodiments can include a mature ICD with over 40 accessible elements including automated tuning options, device status health information, and embedded logging capabilities.

Embodiments can be an IP67 compliant, soldier friendly, wireless personal area device. Installation into the pistol grip can take less than a few seconds to achieve. The PRS variant installation can take less than a minute to install onto the rail. This enables considerable flexibility when a selected training surrogate (e.g. an airsoft gun) has filled the pistol grip. Any form factor that can attach to the fire arm is contemplated herein (e.g., using any suitable clamp).

Embodiments can deliver an array of data elements, e.g., via Bluetooth 4 BLE Specification compatible with modern AR devices such as the Hololens and any other alternative platforms (e.g., Microsoft Windows based PC's, Android 4.3 and later powered mobile devices, iOS 5 and later and Linux distributions with kernel 3.5 and higher can be supported, for example). Embodiments can run an independent Generic Attribute Profile (GATT) infrastructure that allows maximum flexibility for the client device in terms of connection/reconnection and can be well suited for event-based device state changes to be communicated to the receiver.

Embodiments can include an augmented reality scope system (e.g., as shown in FIG. 5) such that the system can take data from the device 100 in a global coordinate system and adjust for orientation of the headset to output what appears to be an optical sight mounted to the firearm.

Embodiments can be scales, e.g., from individual to squad size (e.g., 15 soldiers). Experiments have shown that 15 devices 100 operating within 1-meter proximity can be done with no noticeable performance loss or added system inconsistency. During this experiment, a Microsoft Hololens was included that rendered an Augmented Reality popup target that was engaged using an embodiment of the device 100 disclosed above. The popup target engagement was executed successfully, and no latency was noted by the user even though 14 other devices 100 were operational within a few meters of the user.

Embodiments can be made flexible to cross the real/surrogate barrier. Embodiments of a device 100 can still function on surrogate weapon, for example. Certain embodiments can be configured and employed with a real weapon with a safe conversion such as the UTM Silent Blank Carrier Bolt, a real weapon with a traditional "dirty" blank adapter kit, a real weapon, using real rounds, on AR targets, and/or a surrogate weapon with a $CO_2$ or other system to create a reasonable kick upon trigger pull.

Weapon malfunctions can be injected in the safe bolt/real weapon/traditional blank configurations by placing a dud round in the magazine. An ICD message can be relayed back to the HMD system when the dry fire occurs, for example. Learning algorithms can detect the dry fire/charging handle/forward assist motions of the Slap, Pull, Observe, Release, Tap, and Shoot (SPORTS) training paradigm, for example.

Thus, certain embodiments can be used to differentiate and classify firearm events through machine learning.

Embodiments provide a high-fidelity machine inference model on a portable, firearm attachable device, for example. A svelte inference component of a deeply learned system can provide, for example, improved shot adjudication, rapid analysis of sensor data, future capability enhancements that are not feasible using linear approaches, and/or detection of the SPORTS remediation steps for a firearm (e.g., for the M4 rifle, or analogous steps for the M9 handgun or SAW light machine gun).

Embodiment can include user selectable AI algorithms. End users can dynamically select which AI classification algorithms that simultaneously execute on the device, for example.

Embodiment can include a secondary accelerometer and gyroscope to eliminate errors, e.g., as a result of things that happen to a particular chip operating in submillisecond timing. Having secondary sensors can provide faster response times and improved reliability because current updated data can be taken from whichever is more updated (due to such high speeds, one can lag behind slightly). In certain embodiments, primary and secondary sensors can be set up to produce data at separate rates or same rate off phase to cover all moments of time.

Embodiments can include an accelerometer that can provide shock info and orientation info. Certain embodiment can have one accelerometer aligned in the axis of a barrel to sense when a gun is fired such that the signal will be unique and powerful. Embodiments can include a 6 degree of freedom accelerometer. In certain embodiments, both a primary and secondary accelerometer can provide good clarity as to a shot event, but the secondary can provide more orientation information.

Embodiments can include an acoustic sensor (e.g., a piezo electric device). The acoustic sensor can be used for single weapon firing for determining if gun is fired, for example. Such data can allow refinement in detecting a fire event in conjunction with accelerometer data.

Embodiments can include a Hall sensor that picks up localized magnetic disturbances. This can be used to at least detect when a user's hands have come up to grip the pistol grip, for example.

The learning model can improve shot adjudication by performing deep analysis and classification of sensor array data and reduces errors associated with sensor issues, or user-based impacts that could be used to fool traditional systems (e.g., MILES). Machine learning on the can enable new types of sensor-based classification usable for weapon training. Embodiments of the model can be trained to classify soldier weapon interactions such as the use of the charging handle, M4 forward assist, and the mode selection switches. Malfunction and proper remediation procedures can be sensed, then appropriate ICD events for correlated movements can be sent to the HMD. A judicious ongoing sensor classification of employment of the weapon can provide training improvement by classifying breathing technique before and after the trigger pull, for example.

Embodiments can integrate a full 9 Degrees of Freedom (DOF) Sensor. This 9DOF sensor allows for a complete implementation of a high-fidelity weapon tracking and can provide a significant improvement to a fusion algorithm for a reliable pose estimation that is critical for soldier aiming and tracking. A highly accurate pose model can be finalized on the selected HMD that provides visual corrections. The End User HMD pose estimation model can reasonably leverage the sensors ongoing gyro-stabilized position and orientation values to solidify its localization. An onboard barometric sensor, and altimeter can be used to provide key parameters to weapon flyout algorithms.

A World Magnetic Model (WMM) can be utilized. Embodiments can implement components from the MIL-SPEC WMM (MIL-PRF-89500B) to run on the device 100. The onboard WMM can allow localization improvements by facilitating automatic high quality, geospecific magnetic field compensation. The WMM spherical harmonic model can account for adaptation with respect to temporal magnetic fields due to Earth's dynamic core. The validated WMM contains seven key parameters and encapsulates 168 coefficients but may only need to be computed at boot time.

Embodiments provide a low cost, flexible solution that has been shown to work on real or surrogate weapons. Embodiments can be used with real weapons, with a rapid UTM type conversion, and provide a safe indoor/outdoor training harness. Embodiments can provide free movement and such that there are no constrained areas. Embodiments can be supportive of "on demand" manufacturing techniques and allow for industry standards for interoperability. Embodiment can implement Bluetooth SIG version 4, and/or implements 802.11 wifi for extended functionality if desired. Embodiments can be utilized with augmented reality and/or virtual reality systems.

One or more embodiments can include the below specifications:

Radio Standards—Bluetooth, BR/EDR, Low Energy—2.400-2.4835 GHz 802.11 Wi-Fi b/g/n Security Standards (802.11 option)—WFA, WPA/WPA2 and WAPI Security Standards (BLE option)—AES External Interface—RS-485 UART over USB Battery—Li 350 mA/h Processing—2 core/160-240 MHz scaling RAM—520 KiB SRAM/4 MB PSRAM Cryptographic hardware acceleration—

AES, SHA-2, RSA, elliptic curve cryptography (ECC), Secure boot

External Storage—SD class 10, up to 2 Gb

Power Consumption Max: 100 m/A—Avg: 40 mA As disclosed above, embodiment can reduce or eliminate the requirement for a surrogate training weapon. Surrogate weapons are an expensive component in the Military training strategy. Embodiments utilizing an open ICD can allow for cross platform functionality, providing AR/VR systems, PC's, or smart devices access to shot events.

Embodiments can be based on an array of sensors to determine ground truth weapon state. The device sensor boards can be modular, and independent of the main compute module to enable rapid reconfiguration, for example. Efficient Artificial Intelligence (AI) algorithms can be implemented that enable accurate classification of weapon events such as fires and priming via charging handle activation. Embodiments of the device can provide Weapon State Events, Weapon Orientation and Location information, and local area barometric pressure for flyout algorithms.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A device configured to mount to a firearm, comprising:
    a housing configured to connect to a firearm;
    one or more sensors contained within the housing and configured to output sensor data; and
    a trigger detection module contained within the housing and configured to receive the sensor data from the one or more sensors and to determine whether a trigger event has occurred, wherein the trigger detection module is configured to output a trigger detection signal when the trigger event is detected, wherein the trigger detection signal is configured to be used by an augmented reality or virtual reality system to cause an augmented reality or virtual reality event, wherein the trigger detection module is configured to classify the trigger event to one of a plurality of known trigger event types.

2. The device of claim 1, wherein the trigger detection module includes a machine learning model configured to process the sensor data and to classify the trigger event.

3. The device of claim 2, wherein the machine learning model includes one or more hidden layers, an output layer, and a classified results layer, wherein each hidden layer includes one or more neurons with weights and an activation function which applies non-linearity to produce non-linear results, wherein the output layer adds up the results from the one or more hidden layers and converts the data into one or more bits or bitstrings, wherein the classified results layer is configured to correlated the one or more bits or bitstrings from the output layer into discrete states to output the trigger event type in the trigger detection signal.

4. The device of claim 2, wherein the machine learning model is taught and includes one or more learned weights.

5. The device of claim 1, wherein the one or more sensors includes one or more accelerometers.

6. The device of claim 5, wherein the one or more sensors further include one or more gyroscopes, one or more acoustic sensors, and/or one or more hall sensors.

7. The device of claim 1, further comprising a wireless communication device configured to output the trigger detection signal and a battery configured to power the trigger detection module and/or the wireless communication device.

8. The device of claim 1, wherein the trigger event is firearm event.

9. The device of claim 8, wherein the firearm event is a weapon firing event.

10. The device of claim 1, wherein the device is shaped to mount within a firearm grip, or configured to mount to a rail system of a firearm, or configured to mount to a trigger guard of a fire arm.

11. An augmented reality or virtual reality system, comprising:
    a device in accordance with claim 1;
    an augmented reality or virtual reality display; and
    an augmented reality or virtual reality processor configured to receive the trigger detection signal and to cause an augmented reality or virtual reality event on the augmented reality or virtual reality display.

12. The system of claim 11, wherein the augmented reality or virtual reality event is a simulated projectile event when the trigger detection signal indicates a fire event occurred such that upon receiving the trigger detection signal a simulated projectile is created by the augmented reality or virtual reality processor and displayed on the augmented reality or virtual reality display.

13. The system of claim 12, wherein the augmented reality or virtual reality processor is configured to determine trajectory of the simulated projectile as a function of firearm orientation data included in the trigger detection signal.

14. The system of claim 13, further comprising the firearm and one or more blank cartridges.

15. A method, comprising:
    receiving one or more sensor signals from one or more sensors on a firearm;
    determining, based on the received one or more sensor signals, using a machine learning model on the firearm, whether a trigger event has occurred, wherein the trigger event is one of a plurality of known trigger events of the firearm; and
    outputting a trigger detection signal if the trigger event has occurred.

16. The method of claim 15, further comprising classifying the trigger event to one or more firearm event types before outputting the trigger detection signal.

17. The method of claim 15, wherein outputting includes outputting the trigger detection signal to an augmented reality or virtual reality system.

18. The method of claim 17, further comprising conducting weapons training using the augmented reality or virtual reality system.

* * * * *